H. MEIDINGER.
Apparatus for Cooling Liquids, &c.
No. 136,445. Patented March 4, 1873.
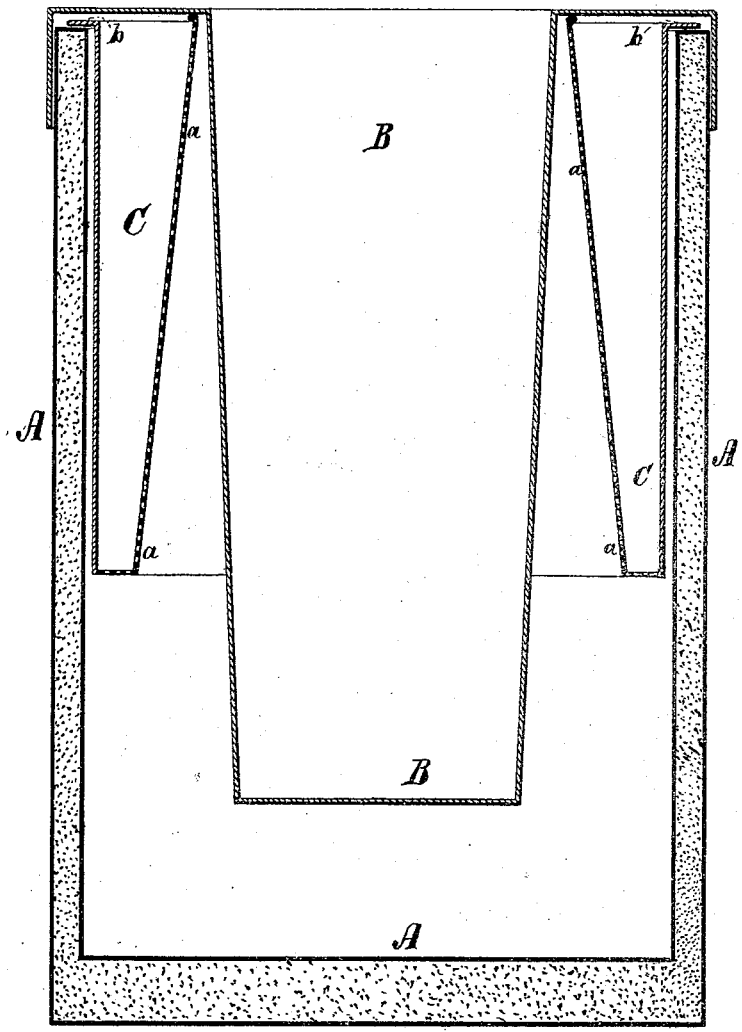

UNITED STATES PATENT OFFICE.

HEINRICH MEIDINGER, OF CARLSRUHE, GERMANY.

IMPROVEMENT IN APPARATUS FOR COOLING LIQUIDS, &c.

Specification forming part of Letters Patent No. 136,445, dated March 4, 1873.

*To all whom it may concern:*

Be it known that I, HEINRICH MEIDINGER, of Carlsruhe, Germany, have invented a new and useful Improvement in Refrigerating Apparatus, of which the following is a specification:

The nature of my invention is an improvement on refrigerating apparatus in which the freezing-mixture consists of ice and common salt.

In the apparatus thus far in use, salt and ice are mixed in the proper proportions, or placed in alternate layers around a vessel containing the substance to be frozen or cooled. This method has the disadvantage, first, that the freezing-mixture, with its progressive liquefaction, decreases in volume, thus exposing the upper portion of the vessel; and, in the second place, that the salt gradually settles to the bottom. For both these reasons the operator is required to stir the freezing-mixture now and then, or move the apparatus by some mechanical contrivance, for which numerous devices have been patented.

By my invention I succeed in producing the same effect in freezing by an improved apparatus, which requires no stirring or mechanical movement whatever. I observed that a solution of common salt of any concentration, and of 32° Fahrenheit, will always dissolve ice, which is, of course, not done by pure water of that temperature; further, that the quantity of ice dissolved is in direct proportion to the salt held in solution, and to the sinking of temperature produced. A concentrated solution of salt will, in contact with the proper weight of ice, produce a temperature of 3° Fahrenheit. If an excess of ice is added, the temperature will rise, because the solution becomes weaker in its concentration, and the ice will dissolve less and less quickly. If, however, an excess of salt is added, the temperature will always be constant—that is, 3°—as long as any ice is left undissolved, because the excess of salt will preserve the solution always in its highest concentration.

On the above principle I constructed an apparatus which is shown by the figure in a vertical section. It is made of tinned iron, or of any other suitable material, and consists of three parts, to wit: First, of the cylinder A, closed at the bottom, open at the top, which cylinder is made double, the interstice being filled with saw-dust; secondly, of the slightly conical vessel B, which has to receive the substance to be cooled, and at the same time forms the cover of the cylinder A; thirdly, of the double ring C, which is open at the top and perforated at the inner wall $a$, and supported by the cylinder A by a top flange, $b$, as shown, or in any other suitable manner. Its height ought to be about one-third, more or less, of the cylinder A. I prefer to have it as a separate piece, as shown; but it may also be fastened by solder, or otherwise, to either the cylinder A or to the receiver B. It serves for holding the salt which is to preserve the salt-solution in its highest concentration.

This apparatus is worked in the following manner: The cylinder A is filled with a certain weight of pounded ice, and then a certain volume of concentrated salt-solution is poured over it. Then the ring-sieve C is filled with coarse salt and hung into the cylinder A; last, the conical vessel B is put through the central opening of the ring-sieve C, and pressed into the floating ice, when the latter will rise up to the rim of the cylinder A.

The quantity of ice and salt to be used varies according to the size of the apparatus. For the smallest size are required about one and a half pound of ice, one-half pound of coarse salt and one-quarter of a liter of concentrated salt-solution, the proportion of salt to ice being about like one to three, beside as much concentrated solution as will fill the apparatus to the rim.

Having thus described my invention, I claim as new and desire to secure by Letters Patent—

1. The double ring and sieve C, arranged substantially in the manner and for the purpose set forth.

2. The vessels A, B, and C, combined with each other, substantially as herein shown and described.

H. MEIDINGER.

Witnesses:
 DAUB,
 ZIMMERMANN.